United States Patent [19]

Larsen

[11] 4,038,008

[45] July 26, 1977

[54] PRODUCTION OF NET OR NET-LIKE PRODUCTS

[75] Inventor: Ronald Leslie Larsen, Minneapolis, Minn.

[73] Assignee: Conwed Corporation, St. Paul, Minn.

[21] Appl. No.: 595,721

[22] Filed: July 14, 1975

Related U.S. Application Data

[63] Continuation of Ser. No. 440,963, Feb. 11, 1974, abandoned.

[51] Int. Cl.² .............................................. B29F 3/04
[52] U.S. Cl. .................................... 425/290; 264/154; 425/311; 425/325; 425/465
[58] Field of Search ............... 425/290, 291, 310, 311, 425/325, 326 P, 382 N, 224, , 467, 466, 380, 381, 465; 264/154, DIG. 21

[56] References Cited

U.S. PATENT DOCUMENTS

| 3,252,181 | 5/1966 | Hureau | 425/224 |
| 3,358,329 | 12/1967 | Martin et al. | 425/464 |
| 3,702,227 | 11/1972 | Hureau | 425/466 |
| 3,791,784 | 2/1974 | Arechavaleta | 425/132 |
| 3,841,815 | 10/1974 | Labarre | 425/311 |
| 3,932,092 | 1/1976 | Hureau et al. | 425/465 X |

Primary Examiner—Francis S. Husar
Assistant Examiner—M. Rosenbaum
Attorney, Agent, or Firm—Eyre, Mann, Lucas & Just

[57] ABSTRACT

An apparatus for the production of perforated tubular film i.e., net is disclosed. A tube of a thermosetting polymer is continuously extruded and the extrusion opening is alternately interrupted first from one side of the tube and then from the other thereby doubling the capacity of the machine.

3 Claims, 1 Drawing Figure

U.S. Patent  July 26, 1977  4,038,008
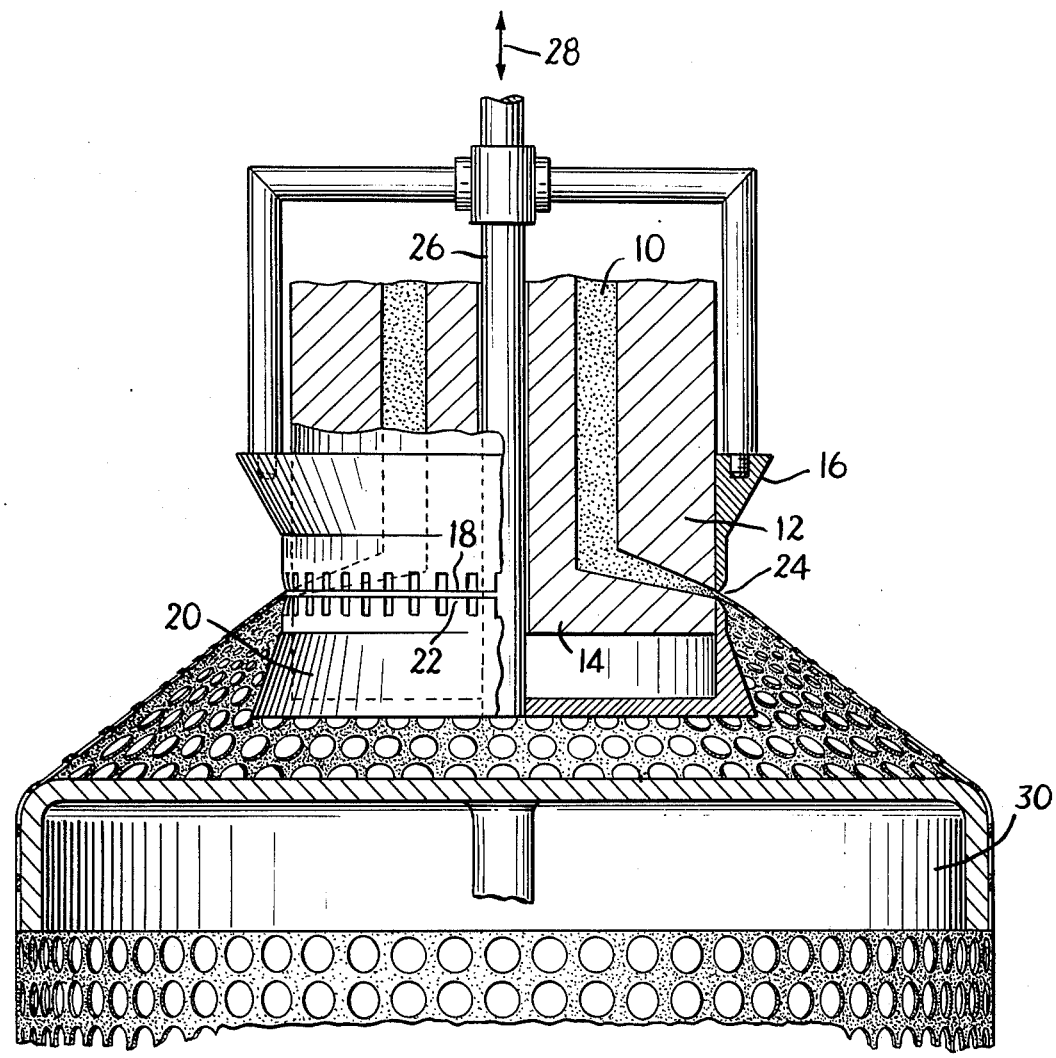

PRODUCTION OF NET OR NET-LIKE PRODUCTS

This is a continuation of application Ser. No. 440,963, filed Feb. 11, 1974, now abandoned.

The present invention relates to an appartus for perforating a tubular film whereby a net or a net-like structure is obtained.

Net-like structures are well-known in the art and are shown for example in Mercer, U.S. Pat. No. 2,919,467, Hureau, U.S. Pat. No. 3,252,181 and Galt, U.S. Pat. No. 3,384,692. One of the practical limitations especially with the Hureau type apparatus is the inability to form net at a high speed due to inherent speed limitations of the machine. In accordance with the present invention, a machine is constructed having two members which alternately block the opening where the tube is being extruded. The two members are integrally affixed so that one complete cycle of the reciprocating mechanism makes two sets of perforations in the extruded sheet thereby doubling the capacity of the machine. This doubling of capacity makes the entire net extrusion operation far more economical and permits the introduction of thermoplastic nets to areas where they would otherwise not be economically viable.

These and other features of the present invention may be more fully understood with respect to the drawing in which an apparatus according to the present invention is illustrated.

Molten polymer 10 is extruded as a continuous tube through die members 12 and 14. The polymer for making the net may be any of the thermoplastic polymers suitable for melt extrusion. Typical of these polymers are the olefins especially polyethylene and polypropylene.

A perforating member 16 positioned above the extruded tube has teeth 18 as shown and likewise perforating member 20 positioned below the tube has teeth 22 as shown. Each of these members, when placed across the extrusion orifice 24 between the die members 12 and 14 will interrupt the flow of polymer through the orifice thereby causing a netlike structure to be formed. The two perforating members 16 and 20 are rigidly connected to each other as for example by bar 26. Bar 26 is reciprocated in up and down manner as shown by arrow 28. The means for reciprocating the bar 26 and thus the perforating members 16 and 20 can be cams or cranks as taught by Hureau or can be a sophisticated hydraulic system taught for example in U.S. Pat. No. 3,749,535. The space between the ends of the teeth 18 and 20 is preferably made equal to the size of the opening 24 so that a solid tube without ribs can be extruded if desired. However, it will be understood that the space between the teeth 18 and 22 could be less or greater than the size of the orifice 24 and that a net in accordance with the present invention could still be obtained.

As member 28 moves up, teeth 22 interrupt the opening to form perforations in the sheet of film being extruded. When member 28 moves down, teeth 22 are moved clear of the extrusion orifice and a continuous sheet is extruded from the orifice 24. As member 28 continues to move down teeth 18 of perforating member 16 will interrupt a part of the extrusion orifice and perforations will again be formed as they were with teeth 22 of perforating member 20. As member 28 is reciprocated this process will be repeated. It will be understood that member 28 can be variably reciprocated in order to obtain different sized holes or different spacings of rows of holes is desired. It is especially desirable in certain applications to have solid horizontal sections that can be heat sealed to form bag containers and it can also be useful for printing. It will further be understood that in some cases the teeth of the perforating members do not have to completely go across orifice 24 in order to form holes and in other cases they may just slightly penetrate the extruding film for special effects.

As shown, the perforating members should be in sliding contact with the die member so that no polymer flows therebetween and in order to effect good, consistent net. This can be accomplished either by having the two member engage or by having a suitable sealing arrangement between the two e.g., an O-ring.

After the tube is extruded and perforated it is preferably drawn over a mandrel 30 as shown. The mandrel will normally be situated in a cooling bath such as water and will partially orient or stretch the tube as it is extruded. If desired, the tube can subsequently be slit into a sheet and then subjected to further orientation or the tube can be oriented in tubular form if desired.

Teeth 18 and 22 need not be of the same size as shown nor need they be directly opposite each other. Similarly, although preferred, the teeth do not have to be straight across the bottom but may be pointed, etc.

It will be understood that the claims are intended to cover all changes and modifications of the preferred embodiments of the invention, herein chosen for the purpose of illustration, which do not constitute departures from the spirit and scope of the invention.

I claim:

1. Apparatus for the production of thermoplastic structures comprising:
   a. an annular extrusion die of a stated diameter and including a pair of spaced die members, said die members defining a single, continuous annular extrusion orifice on the periphery of the extrusion die through which a unitary tube of molten polymer can be extruded substantially radially outward from the extrusion die;
   b. a pair of annular perforating members having a plurality of spaced teeth rigidly affixed to each other with one disposed below the extrusion orifice and the other disposed above the extrusion orifice with the teeth in each perforating member being axially positioned adjacent the extrusion orifice and operative upon reciprocating motion to alternately completely block off selected areas of the said continuous extrusion orifice corresponding to said teeth thereby interrupting the flow of polymer at said selected areas;
   c. said perforating members being substantially in axial sliding contact with said die members at the extrusion orifice; and
   d. an annular mandrel disposed below said extrusion die said mandrel having a diameter greater than the said stated diameter whereby the extruded molten polymer tube will be at least partially oriented when it is drawn over said mandrel.

2. The apparatus of claim 1 wherein the perforating members comprise rectangularly shaped teeth.

3. The apparatus of claim 2 wherein the spaces between the ends of the teeth of the two perforating members is substantially equal to the size of the extrusion orifice.

* * * * *